(12) United States Patent
Shikakura et al.

(10) Patent No.: US 7,997,124 B2
(45) Date of Patent: *Aug. 16, 2011

(54) SCANNING PROBE MICROSCOPE

(75) Inventors: Yoshiteru Shikakura, Chiba (JP); Kazutoshi Watanabe, Chiba (JP)

(73) Assignee: SII NanoTechnology Inc. (JP)

( * ) Notice: Subject to any disclaimer, the term of this patent is extended or adjusted under 35 U.S.C. 154(b) by 861 days.

This patent is subject to a terminal disclaimer.

(21) Appl. No.: 11/879,878

(22) Filed: Jul. 19, 2007

(65) Prior Publication Data
US 2007/0290130 A1  Dec. 20, 2007

Related U.S. Application Data

(63) Continuation-in-part of application No. 11/076,250, filed on Mar. 9, 2005, now Pat. No. 7,284,415.

(30) Foreign Application Priority Data

Mar. 4, 2004  (JP) .................................. 2004-068476

(51) Int. Cl.
G01B 5/28  (2006.01)
(52) U.S. Cl. ........................................................ 73/105

(58) Field of Classification Search ...................... 73/105
See application file for complete search history.

(56) References Cited

U.S. PATENT DOCUMENTS

| | | | | |
|---|---|---|---|---|
| 6,008,489 A * | 12/1999 | Elings et al. | ................... | 250/234 |
| 6,038,916 A * | 3/2000 | Cleveland et al. | ............... | 73/105 |
| 6,357,285 B1 * | 3/2002 | Allen | ................ | 73/105 |
| 7,284,415 B2 * | 10/2007 | Shikakura et al. | .............. | 73/105 |
| 7,373,806 B2 * | 5/2008 | Kitajima et al. | ................. | 73/105 |
| 7,631,546 B2 * | 12/2009 | Masser | ......................... | 73/105 |

* cited by examiner

Primary Examiner — Daniel S Larkin
(74) Attorney, Agent, or Firm — Adams & Wilks

(57) ABSTRACT

A scanning probe microscope has a cantilever mounted to undergo oscillation movement over a surface of a sample. The cantilever has a probe on a distal end thereof. A Z-axis controlling amount calculating mechanism calculates a controlling amount for keeping constant an oscillation amount of the cantilever. A Z-axis driving mechanism drives in a Z direction the cantilever or the sample in accordance with the controlling amount from the Z-axis controlling amount calculating mechanism. A driving range limiting device limits a driving range of the Z-axis driving mechanism. A driving range setting device optionally sets the driving range of the Z-axis driving mechanism.

20 Claims, 8 Drawing Sheets

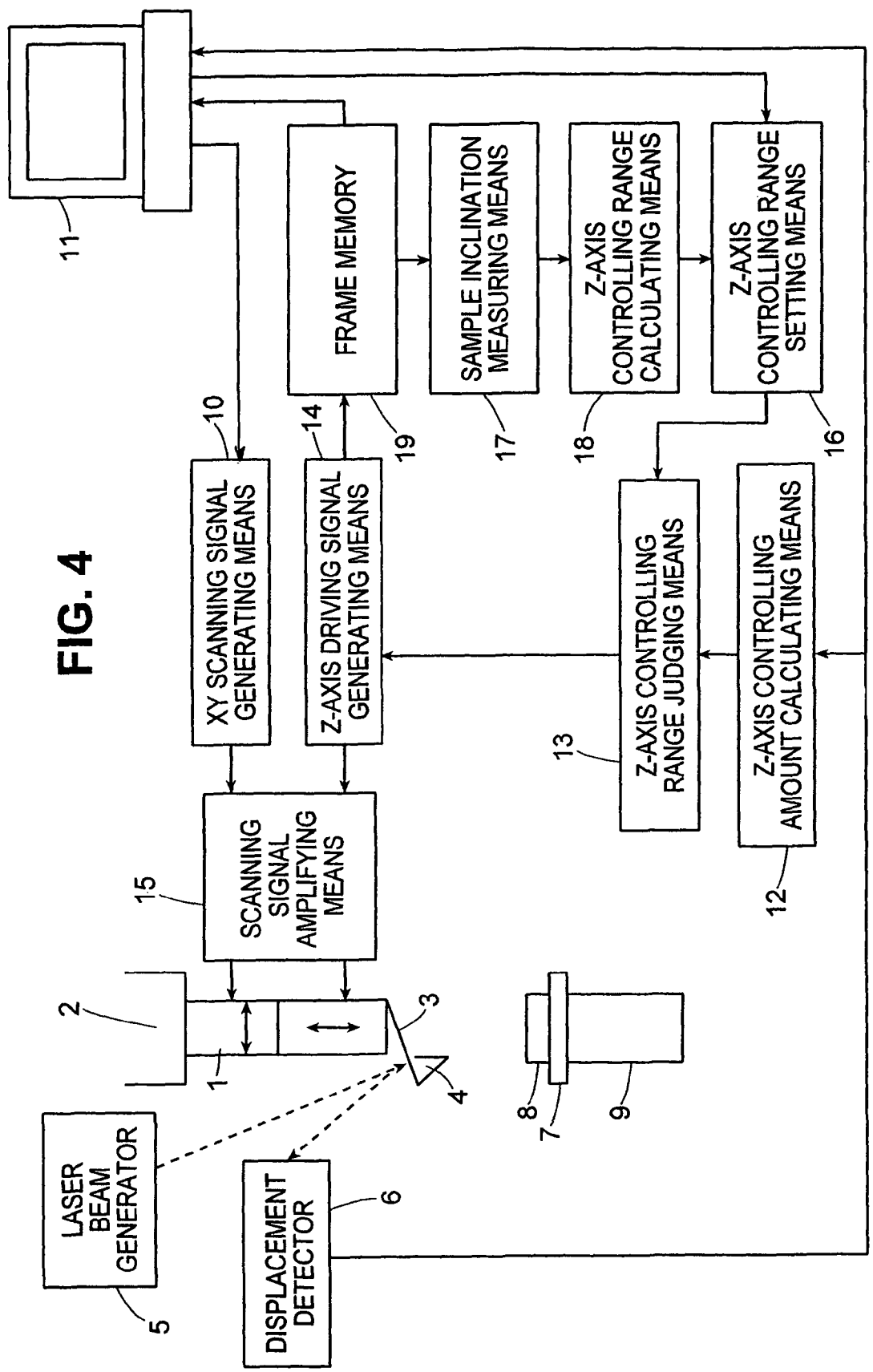

SCANNING DIRECTION

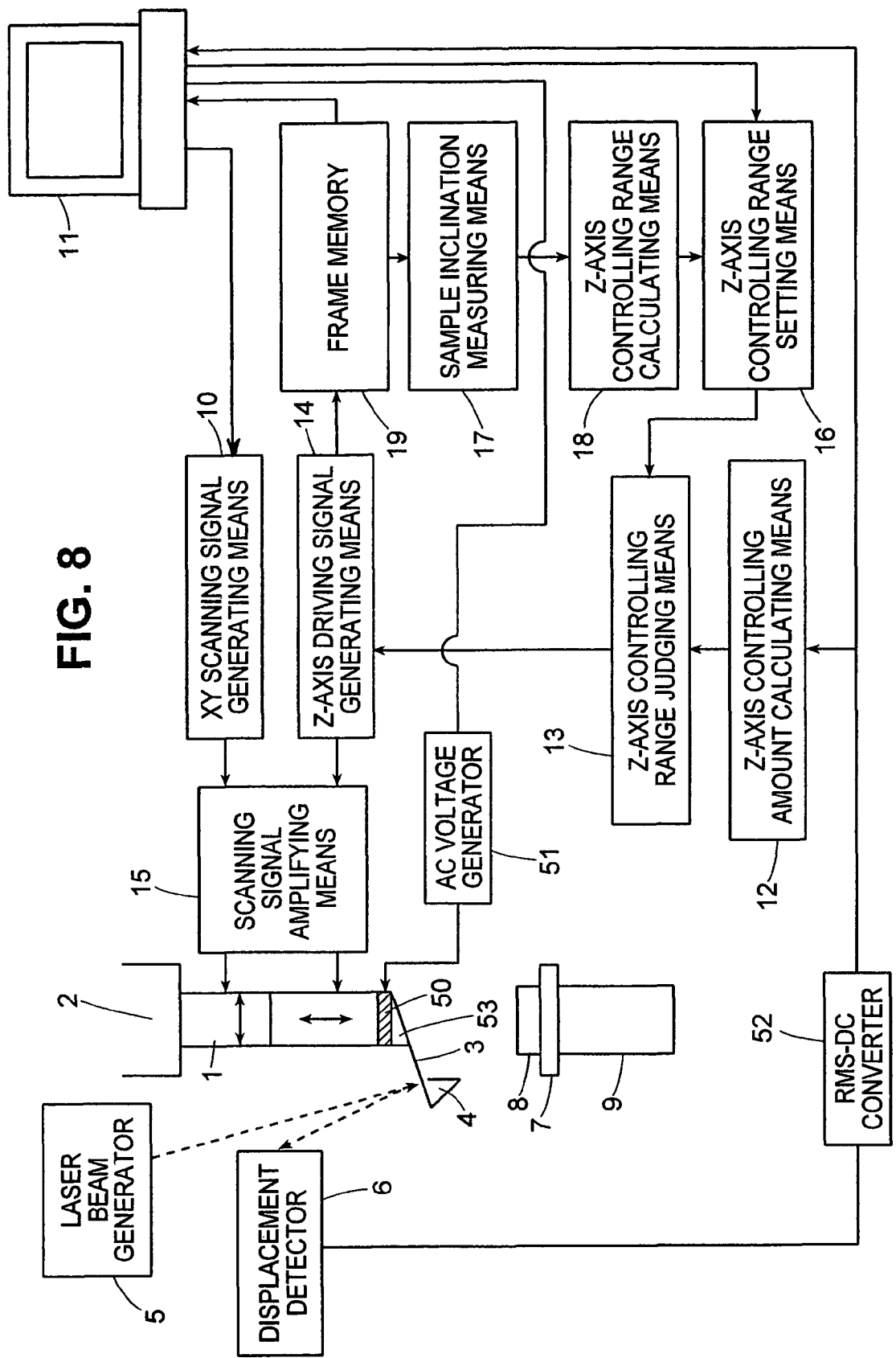

SCANNING PROBE MICROSCOPE

CROSS-REFERENCE TO RELATED APPLICATIONS

This application is a continuation-in-part of U.S. patent application Ser. No. 11/076,250 filed Mar. 9, 2005 and now U.S. Pat. No. 7,284,415, which is herein incorporated by reference in its entirety.

BACKGROUND OF THE INVENTION

1. Field of the Invention

The present invention relates to a scanning probe microscope in which a force exerted between a cantilever provided on its top end with a minute probe and a sample is used for measuring an uneven shape and/or a physical characteristic of a surface of the sample and, particularly, to a scanning probe microscope in which contact between a sample and a probe can be prevented.

2. Background Art

A scanning probe microscope comprises a cantilever having a minute probe on a top end thereof, displacement detecting means for detecting displacement of the cantilever, Z-axis controlling amount calculating means for calculating a controlling amount for keeping constant a displacement amount of the cantilever or an oscillation amount in oscillating the cantilever, Z-axis driving means for driving in a Z direction the cantilever or a sample on the basis of the controlling amount from the Z-axis controlling amount calculating means, XY scanning means for relatively moving the probe in a direction of an XY plane with respect to the sample, and storing means for storing the controlling amount outputted from the Z-axis controlling amount calculating means and a signal outputted from the displacement detecting means. In the scanning probe microscope, the probe scans a surface of the sample by means of the XY scanning means so as to measure an uneven shape and/or a physical characteristic of the surface of the sample. An atomic force microscope (AFM) for detecting atomic force such as a Van der Waals force exerted between a top end of a probe and a surface of a sample is known as an example of the above.

The atomic force microscope includes Z-axis controlling means for controlling a distance between a probe and a sample so that displacement of the cantilever would be kept constant. The atomic force microscope is a scanning probe microscope in which the Z-axis controlling amount is converted into an image so as to convert an uneven shape of a surface of the sample into a three-dimensional image.

When an end of a small piece sample such as a semiconductor is measured in a scanning probe microscope, in the case that there is an area in which there is no sample, the Z-axis driving means is lowered in the area with no sample to a lower limit position in a driving range for the purpose of detecting a nonexistent sample, so that the probe is vainly moved in the air for scanning. Scanning under such a condition is likely to cause breakage of the probe due to contact between the probe and the sample when a scanning speed is faster than a moving speed of the probe to a top surface of the sample after the probe detects the sample although the Z-axis driving means is retracted in order to raise the probe to the top surface of the sample when the probe detects a side surface of the sample.

Therefore, in order to avoid the contact between the probe and the sample, there is used a method for scanning at a speed low enough for the probe to safely move to the top surface of the sample or a method for observing a height of the probe in scanning so as to stop scanning once to move the probe to a safe position before restarting scanning in the case of exceeding a previously set value of limit in height of the probe (e.g., refer to JP-A-2003-166927, Paragraphs 0025-0029, FIG. 4).

The above-mentioned methods, however, have the following problems:

1) It takes a long time to conduct the measurement, thereby lowering the throughput; and 2) Scanning is stopped once in the case of using a piezoelectric element or the like as a scanning device, so that a nonlinear characteristic of the piezoelectric element causes distortion of an image.

SUMMARY OF THE INVENTION

In view of the above-mentioned conventional problems, an object of the invention is to provide a scanning probe microscope that is not only capable of avoiding a contact between a probe and a sample but is also capable of shortening the time from detection of the sample by means of the probe during scanning to raising of the probe to the top surface of the sample.

The foregoing and other objects of the present invention are carried out, in one embodiment, by a scanning probe microscope comprising a cantilever having a minute probe on a distal end thereof, oscillating means for oscillating the cantilever, displacement detecting means for detecting displacement of the oscillated cantilever, Z-axis controlling amount calculating means for calculating a controlling amount for keeping constant an oscillation amount of the cantilever, Z-axis driving means for driving in a Z direction the cantilever or a sample in accordance with the controlling amount from the Z-axis controlling amount calculating means, XY scanning means for relatively moving the probe in a direction of an XY plane with respect to the sample to measure an uneven shape and/or a physical characteristic of the surface of the sample, storing means for storing the controlling amount outputted from the Z-axis controlling amount calculating means and a signal outputted from the displacement detecting means, controlling range limiting means for limiting a driving range of the Z-axis driving means, and controlling range setting means for optionally setting the driving range of the Z-axis driving means.

In another embodiment, the scanning probe microscope further comprises inclination measuring means for measuring an inclination in the Z-axis direction of the surface of the sample, and Z-axis controlling range calculating means for calculating a Z-axis controlling range necessary for measurement in accordance with the inclination of the surface of the sample calculated by the inclination measuring means. The Z-axis controlling range calculated by the Z-axis controlling range calculating means is set in the controlling range setting means.

In the foregoing embodiments, the displacement detecting means comprises, for example, a laser beam generator that radiates a laser beam on a surface of the cantilever on which the probe is not disposed, and a displacement detector that detects a laser beam reflected from the surface of the cantilever as a result of the radiation of the laser beam by the laser beam generator.

By providing a scanning probe microscope having controlling range limiting means for limiting a driving range of the Z-axis driving means, the probe is only lowered to a set position even during scanning of an area with no sample. Accordingly, even when an end of a sample is detected in the area with no sample, a distance that the probe is raised to the top surface of the sample can be shortened and, therefore, the time that the probe is moved to the top surface of the sample is also shortened. This can prevent the probe from being in contact with the sample so that protection of the probe can be achieved.

Further, it is not necessary to lower the scanning speed for the purpose of avoiding contact between the probe and the sample as in the conventional case. This allows a measurement to be carried out with high efficiency.

Moreover, a creep phenomenon, by which a large drive of the Z-axis driving means in the Z direction influences the subsequent operation in the Z direction of the Z-axis driving means to be changed, usually causes distortion of the measured data in the Z direction. The scanning probe microscope of the present invention, however, prevents the foregoing effect resulting from the creep phenomenon.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement and instrumentalities shown. In the drawings:

FIG. 4 is a block diagram showing a structure of a scanning probe microscope according to a second embodiment of the invention;

FIG. 5A is a top view of the sample and FIG. 5B is lateral view of the sample;

FIG. 8 is a block diagram showing a structure of a scanning probe microscope according to a fourth embodiment of the invention.

DETAILED DESCRIPTION OF THE PREFERRED EMBODIMENTS

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

An area with no sample is originally not necessary, so that a probe is not required to be lowered to a lower limit position. Accordingly, the scanning probe microscope of the present invention provides means for limiting a driving range in the Z-axis to a preset value to compare a Z-axis target position calculated by means of a Z-axis controlling amount calculating means with a Z-axis driving lower limit value set in advance. Z-axis control is performed as it is when the Z-axis target position is located higher than the Z-axis driving lower limit value. On the other hand, when the Z-axis target position is located lower than the Z-axis driving lower limit value, a Z-axis controlling position is replaced with the lower limit value so that the probe would not be lowered more than the set lower limit value even in the case where there is no sample in a place or area to be scanned by the probe.

Figure 1:
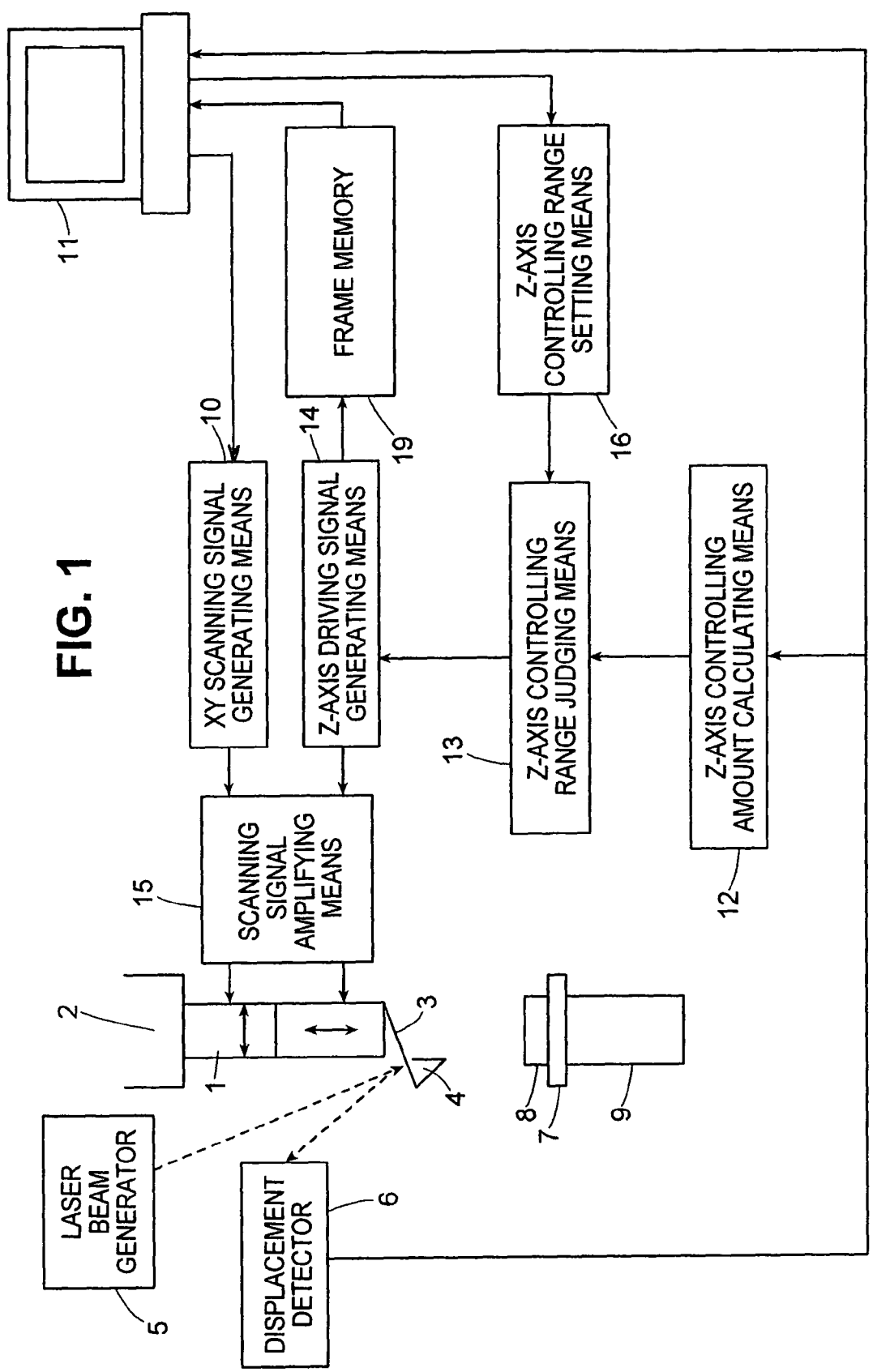
FIG. 1 is a block diagram showing a structure of a scanning probe microscope according to a first embodiment of the invention.

In accordance with the invention, as shown in FIG. 1, a scanning probe microscope comprises a cantilever 3 having a minute probe 4 on its top or distal end, a displacement detector 6 for detecting displacement of the cantilever 3, Z-axis controlling amount calculating means 12 for calculating a controlling amount for controlling a displacement amount of the cantilever or an oscillation amount in oscillating the cantilever to be fixed, Z controlling range judging means 13 for judging the controlling amount from the Z-axis controlling amount calculating means 12, Z driving signal generating means 14 for generating a driving signal on the basis of the controlling amount from the Z-axis controlling amount calculating means 12, scanning signal amplifying means 15 for amplifying a controlling signal from the Z driving signal generating means 14, a piezoelectric element 1 for driving in a Z direction the cantilever 3 on the basis of the signal amplified by means of the scanning signal amplifying means 15, XY scanning means for relatively moving the probe 4 on a surface of a sample in a direction of an XY plane, and storing means for storing the controlling amount outputted from the Z driving signal generating means 14 and the signal outputted from the displacement detecting means. An uneven shape and a physical characteristic of the surface of the sample are measured on the basis of the displacement amount of the cantilever in scanning the surface of the sample by means of the probe. In the present invention, a range within which the piezoelectric element 1 can be driven in the Z direction is optionally limited to be able to prevent the probe from being unnecessarily lowered too much even in scanning an area with no sample. This allows the probe to be raised to a top surface of the sample immediately after detecting the sample. Embodiments of the invention will be described in detail hereinafter on the basis of the drawings.

Embodiment 1

A first embodiment of the scanning probe microscope in accordance with the invention will be described with reference to FIGS. 1 to 3.

FIG. 1 is a block diagram showing a structure of a scanning probe microscope in the first embodiment of the invention. A piezoelectric element 1 is used as Z-axis driving means and XY scanning means while an electrode for driving in a Z-axis direction, which is not shown, and an electrode for XY scanning, which is also not shown, are provided on an outer surface. The piezoelectric element 1 is three-dimensionally driven in accordance with a voltage applied to the respective electrodes. One piezoelectric element 1 (an upper one in the drawings) is fixed to a base body 2 while a cantilever 3 is detachably fixed to the other piezoelectric element 1. The cantilever 3 has a minute cantilevered spring structure in which a probe 4 is provided on one end thereof. A laser beam from a laser beam generator 5 is radiated on a surface of the cantilever 3 on which no probe is formed. The laser beam reflected from the surface of the cantilever 3 is incident on a displacement detector 6. The displacement detector 6 comprises an optically detecting electrode, which has been divided into four. Displacement of the cantilever 3 is arranged to be detectable on the basis of a voltage outputted from the four-divided electrode.

A sample 8 is fixed on a sample table 7 to be arranged at a location opposing the cantilever 3. The sample table 7 is fixed to coarse moving means 9. The coarse moving means 9 comprises a stepping motor and a screw mechanism for converting a rotating movement of the stepping motor into a straight movement. The coarse moving means 9 is arranged so that the rotating movement of the stepping motor can cause the sample 8 to be vertically moved, and thereby, contacted with the cantilever 3.

XY scanning signal generating means 10 obtains scanning area information from a controlling computer 11 to generate a scanning signal. A voltage of the scanning signal is amplified by means of scanning signal amplifying means 15 and applied to the electrode for XY-scanning, which is formed in the piezoelectric element 1. The piezoelectric element 1 to which the voltage for scanning has been applied is arranged to be driven in an X direction and a Y direction in a regular cycle or in an irregular cycle so that the probe 4 of the cantilever 3 would XY-scan the surface of the sample 8.

When the probe 4 scans the surface of the sample 8, roughness of the surface of the sample influences the cantilever 3 to be minutely displaced (bent). The displacement amount is detected by means of the displacement detector 6 which outputs a displacement amount signal to the controlling computer 11 and the Z-axis controlling amount calculating means 12. In the Z-axis controlling amount calculating means 12, a controlling amount corresponding to the voltage to be applied to the piezoelectric element 1 is calculated on the basis of the inputted displacement amount of the cantilever 3. The controlling amount is inputted to Z-axis controlling range judging means 13 as Z-axis controlling range limiting means. In the Z-axis controlling range judging means 13 it is judged whether the inputted controlling amount is within a controlling range or not. In the case that the inputted controlling amount is out of the controlling range, the inputted controlling amount is changed to a controlling range limiting value, which is inputted to Z-axis driving signal generating means 14 for limiting the Z controlling range. Z-axis controlling range setting means 16 is capable of changing a judged value by inputting to the Z-axis controlling range judging means 13 a judging reference value inputted from the controlling computer 11. In the Z driving signal generating means 14, a driving signal is generated on the basis of the inputted controlling amount. The generated driving signal is amplified by means of the scanning signal amplifying means 15 to be inputted to the piezoelectric element 1. The piezoelectric element 1 is only driven in the Z direction for the inputted signal amount, so that the cantilever is moved vertically to control the displacement amount of the cantilever 3.

Further, a controlling signal from the Z-axis driving signal generating means 14 is stored in the frame memory 19 used as storing means. The data stored in the frame memory 19 is inputted to the controlling computer 11, which performs an imaging process into a two-dimensional or three-dimensional image.

Figure 2A:
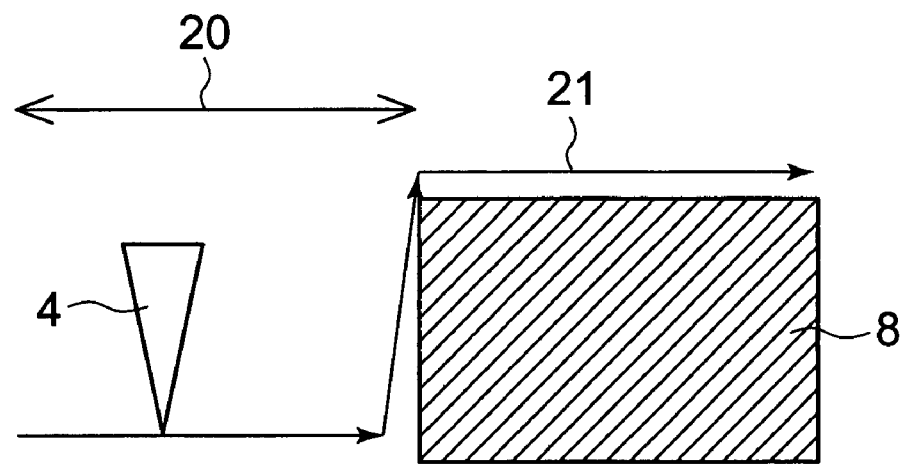
FIGS. 2A and 2B illustrate traces 21 of a probe in conventional scanning and in scanning according to the invention, respectively.

In the conventional scanning probe microscope, however, the cantilever is lowered to the lowest limit position, to which the cantilever can be moved by means of the piezoelectric element 1, when an area with no sample 20 is scanned as shown in FIG. 2A. There is thus a time lag after the probe detects the sample before Z-axis control is operated to retract the piezoelectric element 1 so as to raise the probe 4 to the top surface of the sample. Accordingly, when the raising of the probe 4 is delayed with respect to the XY scanning, the sample 8 is likely to be in contact with the probe 4, which causes breakage of the probe 4. Further, it is necessary to stop scanning once or to scan at a low speed in order to avoid the contact.

Therefore, in the invention, the Z-axis controlling range judging means 13 is arranged to be used for comparing the controlling amount from the Z-axis controlling amount calculating means 12 to the judging reference value inputted by the Z-axis controlling range setting means 16 in order to limit the Z-axis controlling range.

Figure 3:
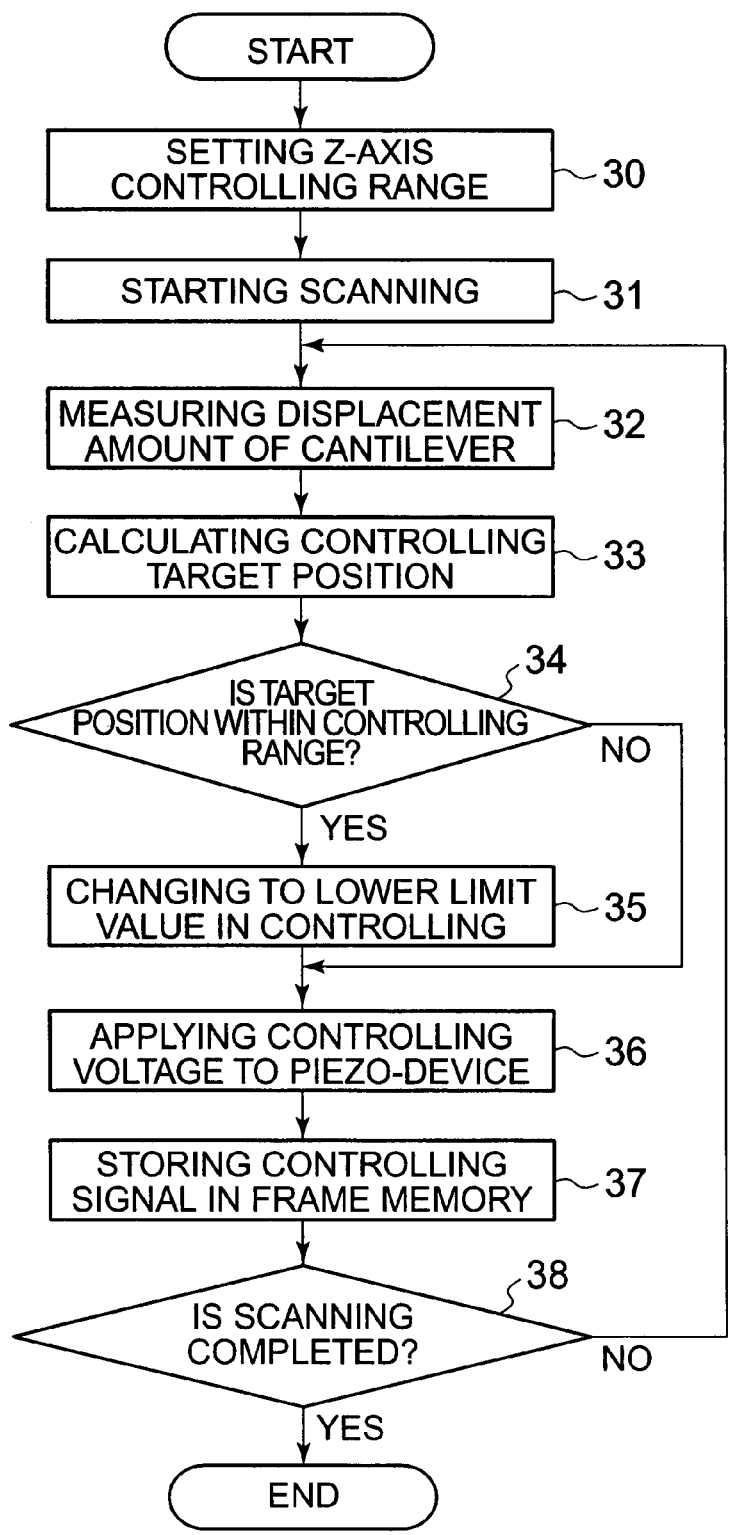
FIG. 3 is a flowchart of an operation of the scanning probe microscope according to the first embodiment of the invention.

FIG. 3 is a flowchart of the operation of the scanning probe microscope according to the first embodiment. An operation of the scanning probe microscope will be described on the basis of the flowchart.

Step 30: The controlling range, which is set by means of the Z-axis controlling range setting means 16, is set.

Step 31: Scanning is started.

Step 32: The probe 4 is vertically moved along the uneven shape of the surface of the sample 8 to measure the vertical movement of the probe 4 as a displacement amount of the cantilever by means of the displacement detector 6.

Step 33: The Z-axis controlling amount calculating means 12 is used for calculating a Z-axis controlling target position on the basis of the displacement amount of the cantilever.

Step 34: The controlling target position calculated in Step 33 is compared with the Z-axis controlling range set at Step 30. If the controlling target position is not within the Z-axis controlling range (NO option), then the process goes to Step 35, otherwise the process goes to Step 36 (YES option).

Step 35: Setting is changed so that the controlling target position would be a lower limit position when the controlling target position is lower than the lower limit position of the controlling range.

Step 36: The controlling target position (signal) calculated in Steps 34 and 35 is amplified into the controlling voltage to be applied to the piezoelectric element 1.

Step 37: The controlling target position (signal) calculated in Steps 34 and 35 is stored in the frame memory.

Step 38: It is judged whether scanning is completed or not. More specifically, if the scanning distance reaches the predetermined distance (YES option), the process ends, otherwise the process goes back to Step 32 (NO option).

Figure 2B:
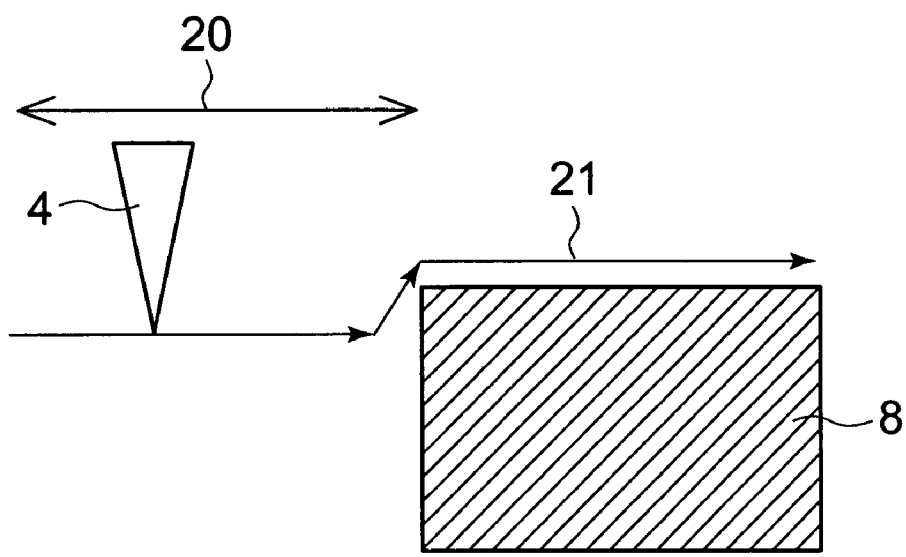

FIGS. 2A-2B are lateral views illustrating traces of a top end of the probe during scanning.

FIG. 2A illustrates traces 21 of a top end of the probe in the case that the invention is not carried out. Scanning is performed with the probe 4 being lowered to the lower limit position of the controlling range of the piezoelectric element when the area with no sample 20 is scanned. When the probe 4 detects the sample 8 during scanning, a displacement signal from the displacement detector 6 is changed to retract the piezoelectric element in accordance with the Z-axis driving voltage from the Z-axis controlling means, so that the probe 4 is raised to the top surface of the sample 8. The probe 4 is, however, likely to have a collision with the sample 8 in the case that the raising speed is slower than the scanning speed.

FIG. 2B illustrates traces 21 of the top end of the probe in the case of carrying out the invention. The probe 4 is only lowered to a set position within the Z-axis controlling range even when the area with no sample 20 is scanned. Accordingly, the probe 4 can be raised to the top surface of the sample without any trouble when the probe 4 detects the sample 8 during scanning. This allows a collision between the probe 4 and the sample 8 to be avoided.

Embodiment 2

A second embodiment of a scanning probe microscope in accordance with the invention will be described on the basis of FIGS. 4 to 6.

Figures 5A, 5B:
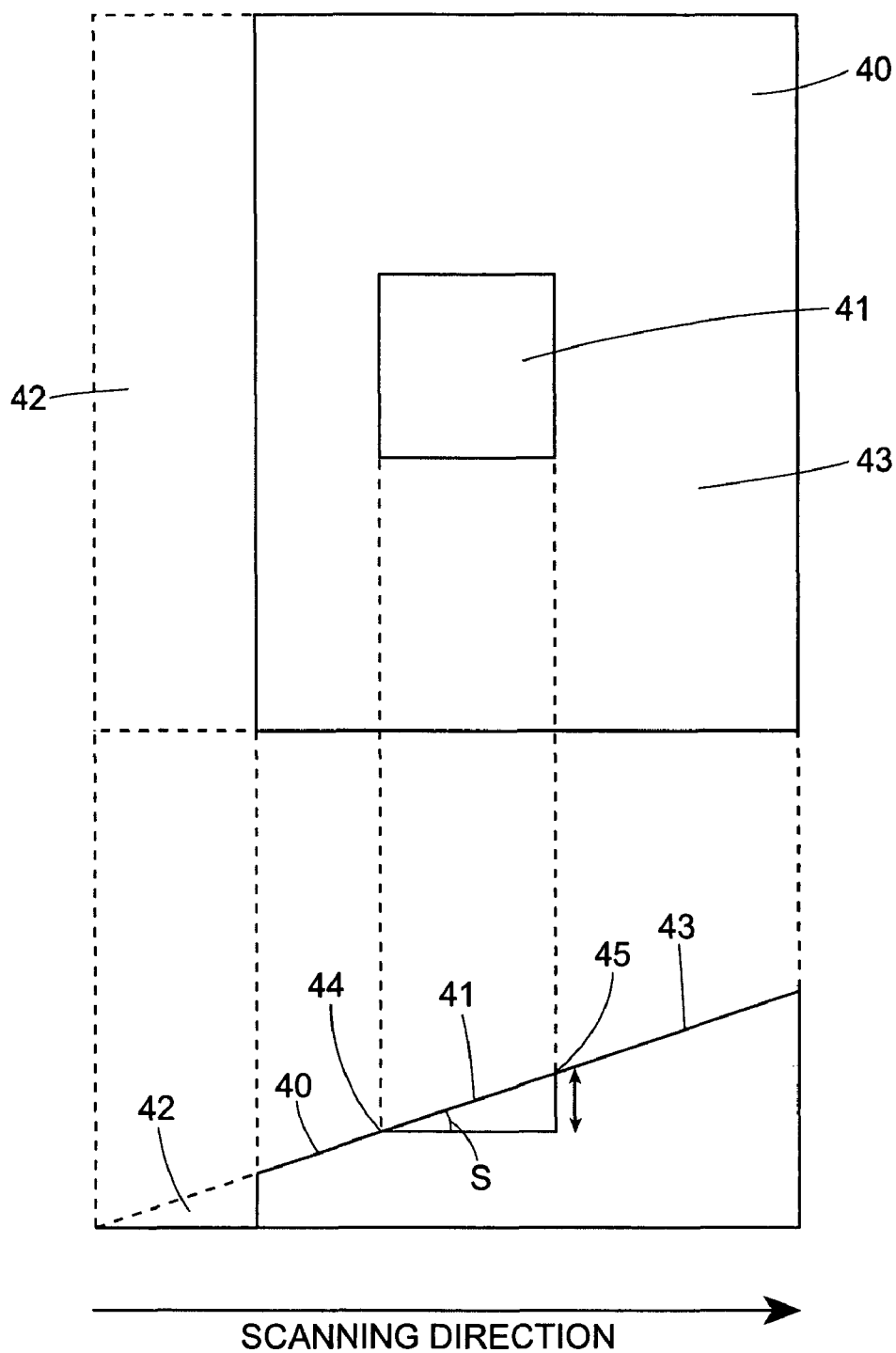
FIGS. 5A-5B illustrate a sample measured by the scanning probe microscope according to the second embodiment of the invention, where

FIG. 4 is a block diagram of a scanning probe microscope in the second embodiment of the invention. The scanning probe microscope in the second embodiment is characterized in that sample inclination measuring means 17 and Z-axis controlling range calculating means 18 are added to the scanning probe microscope in the first embodiment shown in FIG. 1. Other common components are marked with the same signs and numerals as those of FIG. 1 and a detailed description thereof is omitted. FIG. 5A illustrates in a top view a sample 43 which is measured with the scanning probe microscope in the second embodiment of the invention. FIG. 5B illustrates a lateral view the sample 43.

Generally in a scanning probe microscope, a minute difference in orthogonal angle between a surface of the sample 43 and the Z-axis driving means influences the surface of the sample 43 so that a difference in height in the Z-axis direction at a plurality of plural points, that is, inclination of the surface of the sample would be generated even when the surface of the sample 43 is flat, in many cases. The difference in height due to the inclination becomes larger than the difference in roughness of the surface of the sample 43 when the scanning area becomes large. Accordingly, it is sometimes difficult to properly set the Z-axis controlling range. Numeral 42 denotes in FIG. 5B an area with no sample.

In view of the above, the invention has a structure in which inspection measurement for measuring inclination is carried out before measuring and the inclination of the sample 43 is measured on the basis of the measurement data obtained by the inspection measurement so as to set a proper Z-axis controlling range.

The piezoelectric element 1 scans an inspection area 41, which is a minute and flat area, before main measurement. The Z-axis controlling position (height) at respective measuring points is stored in the frame memory 19 by means of the Z-axis driving signal generating means 14. The inspection area 41 is a flat place with no large difference in level on the surface of the sample 43. It is possible, for example, to measure an area which is smaller than a measuring area 40 and which has samples all over the area, to set a flat area as an inspection area on the basis of the measurement data of the above.

After completing the measurement for inspection, the measurement data stored in the frame memory 19 is inputted to the sample inclination measuring means 17. With the sample inclination measuring means 17, a minimum value Zmin 44 and a maximum value Zmax 45 of the height of the inputted measurement data are measured. An inclination degree S, which indicates inclination of a sample, is calculated by the following formula (1):

$$S = (Zmax - Zmin)/(Dmax + Dmin) \qquad (1)$$

wherein Dmin denotes a distance from a center of the inspection area 41 to a measured position of Zmin 44 and Dmax denotes a distance from the center of the inspection area 41 to a measured position of Zmax 45.

The inclination degree S calculated in the formula (1) is inputted into the Z controlling range calculating means 18. In the Z controlling range calculating means 18, a lowest limit position Zlimit of the Z controlling position at the end of the measuring area is calculated by the following formula (2):

$$Zlimit = Zcenter - S \cdot \sqrt{(X \cdot X + Y \cdot Y)} - Z\alpha \qquad (2)$$

wherein X denotes a length of a side of the measuring area in the inclination degree S and the main measurement, Y denotes a length of a side orthogonal to X, Zcenter denotes a Z controlling position at a center part of the measuring area, and Zα denotes a value as a margin of the lower limit value.

The value Zlimit calculated in the formula (2) is inputted to the Z-axis controlling range setting means 16, so that the Z-axis controlling range can be changed. This allows a proper Z-axis controlling range to be set in view of the inclination of the surface of the sample 43 as described above.

Figure 6:
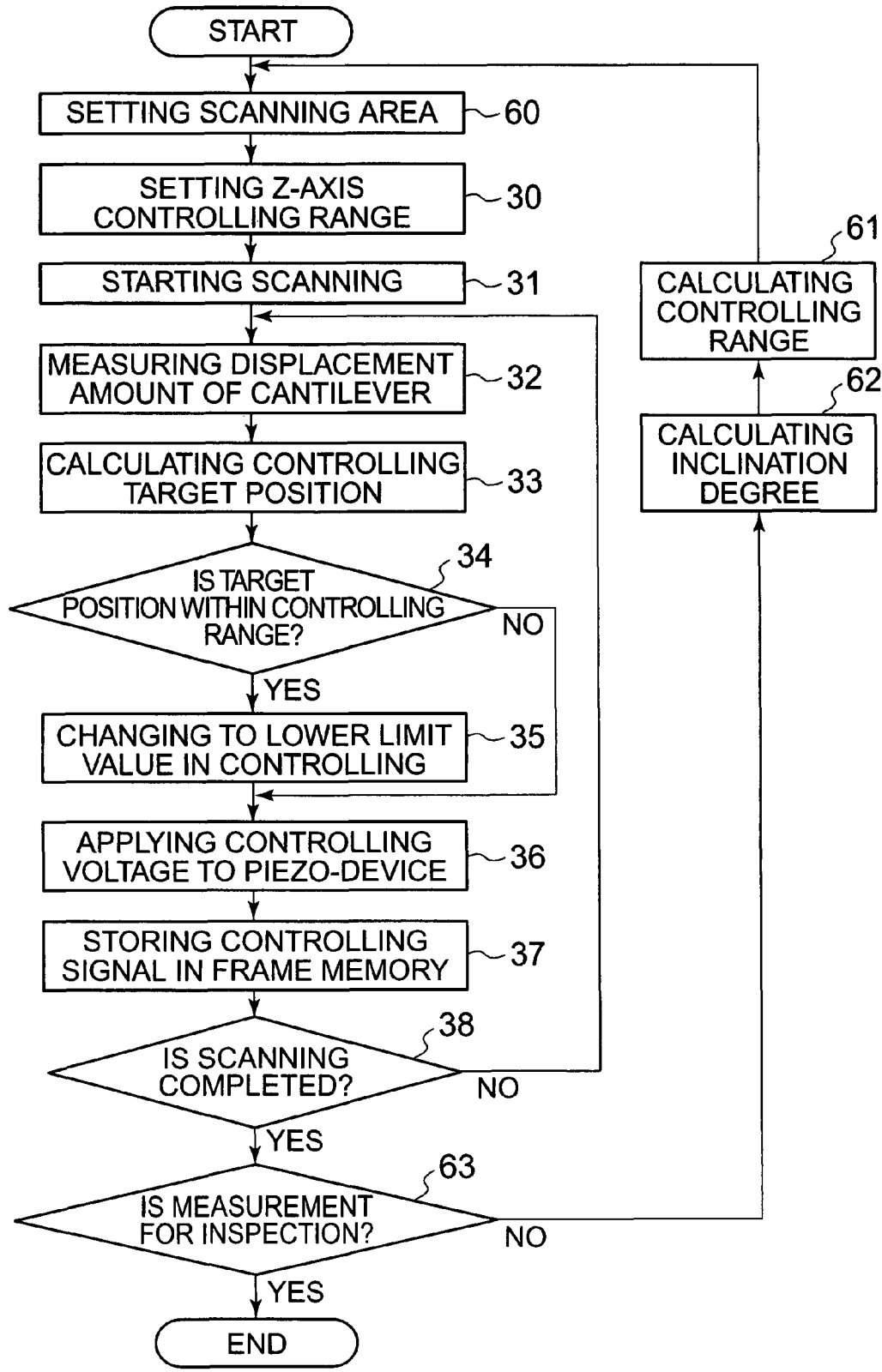
FIG. 6 is a flow chart of an operation of the scanning probe microscope according to the second embodiment of the invention.

FIG. 6 is a flowchart of an operation of the scanning probe microscope in the second embodiment of the invention. The operation will be described hereinafter on the basis of the flowchart.

Step 60: A scanning area corresponding to the inspection area 41 is set.

Step 30: The maximum width of the Z controlling range is set.

Steps 31 to 38: Description is omitted since the operation after starting scanning is same as that of the first embodiment.

Step 63: Whether the measurement is for inspection or as a main one is judged after completing scanning.

Step 62: An inclination degree is calculated on the basis of the measured data stored in the frame memory in the case of the measurement for inspection.

Step 61: A proper Z controlling range is calculated on the basis of the inclination degree calculated in Step 62.

Step 60: A scanning area corresponding to the main measurement is set.

Step 30: The Z controlling range calculated in Step 61 is set.

Steps 31 to 38: The main measurement is performed.

Step 63: The main measurement is judged to be completed and the operation is ended.

Embodiment 3

Figure 7:
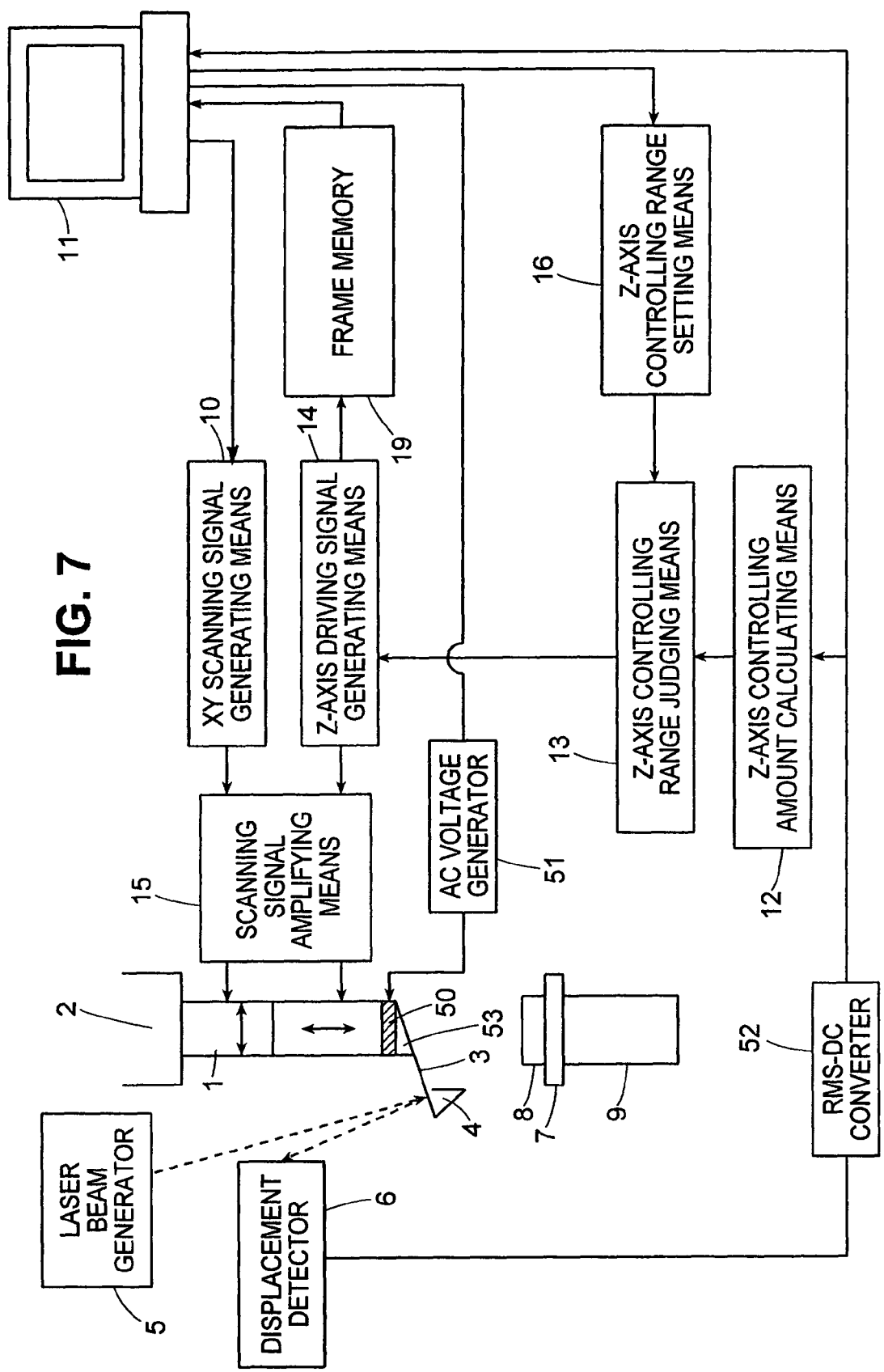
FIG. 7 is a block diagram showing a structure of a scanning probe microscope according to a third embodiment of the invention.

FIG. 7 is a block diagram of a scanning probe microscope in accordance with a third embodiment of the invention. The scanning probe microscope shown in FIG. 7 differs from the scanning probe microscope shown in FIG. 1 in that FIG. 7 denotes an oscillation mode in which the cantilever 3 is forcibly oscillated with a resonance frequency. An oscillating element 50 is fixed between the piezoelectric element 1 and the cantilever 3 via a spacer element 53. A voltage amplitude and a frequency are inputted to an AC voltage generator 51 from the controlling computer 11, and the AC voltage generator 51 can generate any AC voltage. The oscillating element 50, as oscillating means, oscillates in accordance with the AC voltage applied to an electrode (not shown) of the oscillating element 50, thereby oscillating the cantilever 3. The displacement such as a frequency or the amplitude of the oscillated cantilever 3 is detected as an AC signal by the displacement detector 6 using the reflection of the laser from the laser generator 5. The detected AC signal is inverted into a DC signal in a RMSDC converter 52 and inputted to the controlling computer 11 and the z-axis controlling amount calculating means 12. By this construction and operation, it is possible to detect the displacement of the cantilever 3 in a forcibly oscillated state.

Embodiment 4

FIG. 8 is a block diagram of a scanning probe microscope in accordance with a fourth embodiment of the invention. The scanning probe microscope shown in FIG. 8 differs from the scanning probe microscope shown in FIG. 4 in that FIG. 8 denotes an oscillation mode in which the cantilever 3 is forcibly oscillated with a resonance frequency. The structure and operation of the structure for detecting the displacement of the cantilever 3 in a forcibly oscillated state is as described above for the embodiment of FIG. 7.

From the foregoing description, it can be seen that the present invention comprises an improved scanning probe microscope. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the appended claims.

What is claimed is:

1. A scanning probe microscope comprising:
   a cantilever having a minute probe on a distal end thereof;
   oscillating means for oscillating the cantilever;
   displacement detecting means for detecting displacement of the oscillated cantilever;
   Z-axis controlling amount calculating means for calculating a controlling amount for keeping constant an oscillation amount of the cantilever;
   Z-axis driving means for driving in a Z direction the cantilever or a sample in accordance with the controlling amount from the Z-axis controlling amount calculating means;
   XY scanning means for relatively moving the probe in a direction of an XY plane with respect to the sample to measure an uneven shape and/or a physical characteristic of the surface of the sample;
   storing means for storing the controlling amount outputted from the Z-axis controlling amount calculating means and a signal outputted from the displacement detecting means;
   controlling range limiting means for limiting a driving range of the Z-axis driving means; and
   controlling range setting means for optionally setting the driving range of the Z-axis driving means.

2. A scanning probe microscope according to claim 1; further comprising inclination measuring means for measuring an inclination in the Z-axis direction of the surface of the sample; and Z-axis controlling range calculating means for calculating a Z-axis controlling range necessary for measurement in accordance with the inclination of the surface of the sample calculated by the inclination measuring means; wherein the Z-axis controlling range calculated by the Z-axis controlling range calculating means is set in the controlling range setting means.

3. A scanning probe microscope according to claim 2; wherein each of the Z-axis driving means and the XY scanning means comprises a piezoelectric element.

4. A scanning probe microscope according to claim 2; wherein the displacement detecting means comprises a laser beam generator that radiates a laser beam on a surface of the cantilever on which the probe is not disposed, and a displacement detector that detects a laser beam reflected from the surface of the cantilever as a result of the radiation of the laser beam by the laser beam generator.

5. A scanning probe microscope according to claim 2; wherein the Z-axis driving means comprises a piezoelectric element; and wherein the oscillating means comprises an oscillating element disposed between the piezoelectric element and the cantilever.

6. A scanning probe microscope according to claim 5; further comprising an AC voltage generator for supplying an AC voltage to the oscillating element.

7. A scanning probe microscope according to claim 1; wherein each of the Z-axis driving means and the XY scanning means comprises a piezoelectric element.

8. A scanning probe microscope according to claim 1; wherein the displacement detecting means comprises a laser beam generator that radiates a laser beam on a surface portion of the cantilever on which the probe is not disposed, and a displacement detector that detects a laser beam reflected from the surface of the cantilever as a result of the radiation of the laser beam by the laser beam generator.

9. A scanning probe microscope according to claim 1; wherein the Z-axis driving means comprises a piezoelectric element; and wherein the oscillating means comprises an oscillating element disposed between the piezoelectric element and the cantilever.

10. A scanning probe microscope according to claim 9; further comprising an AC voltage generator for supplying an AC voltage to the oscillating element.

11. A scanning probe microscope comprising:
    a cantilever mounted to undergo oscillation movement over a surface of a sample, the cantilever having a probe on a distal end thereof;
    a Z-axis controlling amount calculating mechanism that calculates a controlling amount for keeping constant an oscillation amount of the cantilever;
    a Z-axis driving mechanism that drives in a Z direction the cantilever or the sample in accordance with the controlling amount from the Z-axis controlling amount calculating mechanism;
    a driving range limiting device that limits a driving range of the Z-axis driving mechanism; and
    a driving range setting device that optionally sets the driving range of the Z-axis driving mechanism.

12. A scanning probe microscope according to claim 11; wherein the Z-axis driving mechanism comprises a piezoelectric element.

13. A scanning probe microscope according to claim 11; further comprising a displacement detecting mechanism that detects displacement of the oscillated cantilever.

14. A scanning probe microscope according to claim 11; wherein the Z-axis driving mechanism comprises a piezoelectric element; and further comprising an oscillating element disposed between the piezoelectric element and the cantilever for oscillating the cantilever.

15. A scanning probe microscope according to claim 11; further comprising an AC voltage generator for supplying an AC voltage to the oscillating element.

16. A scanning probe microscope according to claim 11; further comprising an inclination measuring device that measures an inclination in the Z-axis direction of the surface of the sample; and a Z-axis controlling range calculating mechanism that calculates a Z-axis controlling range necessary for measurement in accordance with the inclination of the surface of the sample calculated by the inclination measuring device, the Z-axis controlling range being set in the driving range setting device.

17. A scanning probe microscope according to claim 16; wherein the Z-axis driving mechanism comprises a piezoelectric element; and further comprising an oscillating element disposed between the piezoelectric element and the cantilever for oscillating the cantilever.

18. A scanning probe microscope according to claim 17; further comprising an AC voltage generator for supplying an AC voltage to the oscillating element.

19. A scanning probe microscope according to claim 16; further comprising a displacement detecting device that detects displacement of the cantilever.

20. A scanning probe microscope according to claim 16; wherein the Z-axis driving mechanism comprises a piezoelectric element.

* * * * *